US012755632B2

(12) United States Patent
Sun

(10) Patent No.: US 12,755,632 B2
(45) Date of Patent: Oct. 6, 2026

(54) IoT-BASED INTELLIGENT PARKING MANAGEMENT SYSTEM

(71) Applicant: Chu Sun, Dalian (CN)

(72) Inventor: Chu Sun, Dalian (CN)

(*) Notice: Subject to any disclaimer, the term of this patent is extended or adjusted under 35 U.S.C. 154(b) by 22 days.

(21) Appl. No.: 18/966,780

(22) Filed: Dec. 3, 2024

(65) Prior Publication Data

US 2025/0095488 A1 Mar. 20, 2025

Related U.S. Application Data

(63) Continuation of application No. PCT/CN2023/116058, filed on Aug. 31, 2023.

(30) Foreign Application Priority Data

Jul. 15, 2022 (CN) ........................ 202210836891.9

(51) Int. Cl.
*G08G 1/0967* (2006.01)
*B60W 60/00* (2020.01)
(Continued)

(52) U.S. Cl.
CPC ..... *G08G 1/096725* (2013.01); *B60W 60/001* (2020.02); *E04H 6/422* (2013.01);
(Continued)

(58) Field of Classification Search
CPC .... G08G 1/096725; G08G 1/14; G08G 1/144; G08G 1/146; G08G 1/148; G08G 1/096833; B60W 60/001; B60W 2556/45; E04H 6/422; G05D 1/222; G05D 2101/22; G05D 2107/13; G05D 2109/10;
(Continued)

(56) References Cited

U.S. PATENT DOCUMENTS 10,459,442 B1 * 10/2019 Hayes .................. G08G 1/0112
10,657,815 B2 * 5/2020 Gruteser ................ B60Q 9/004
(Continued)

FOREIGN PATENT DOCUMENTS

CN 106846870 A 6/2017
CN 109887326 A 6/2019
CN 114724398 A 7/2022

*Primary Examiner* — Thomas Ingram
(74) *Attorney, Agent, or Firm* — George D. Morgan

(57) ABSTRACT

The present invention provides an IoT-based intelligent parking management system, including: a parking lot management system, an autonomous vehicle, and a handheld mobile terminal that are communicationally connected to each other; the parking lot management system includes a parking lot hardware perception layer and a parking lot server, where the parking lot hardware perception layer includes a terminal node and an information transmission module deployed in a parking lot; the autonomous vehicle includes an autonomous driving controller and an information transmission module, where the autonomous driving controller receives communication data from the parking lot server or the handheld mobile terminal through the information transmission module and generates control signals that control actions of a vehicle drive system; and the handheld mobile terminal is provided with a human-machine interaction interface.

1 Claim, 4 Drawing Sheets

(51) Int. Cl.

| | |
|---|---|
| ***E04H 6/42*** | (2006.01) |
| ***G05D 1/222*** | (2024.01) |
| ***G05D 101/00*** | (2024.01) |

(52) U.S. Cl.
CPC ......... *G05D 1/222* (2024.01); *B60W 2556/45* (2020.02); *G05D 2101/22* (2024.01)

(58) Field of Classification Search
CPC .... G05D 2111/10; G05D 1/249; G06Q 10/06; G06Q 10/02; H04L 67/12
See application file for complete search history.

(56) References Cited

U.S. PATENT DOCUMENTS

| | | | | |
|---|---|---|---|---|
| 11,250,363 | B2 * | 2/2022 | Sayarshad .......... | G06Q 30/0284 |
| 11,807,222 | B2 * | 11/2023 | Hidaka .................. | G08G 1/143 |
| 2021/0009111 | A1 * | 1/2021 | Kang .................... | B60W 30/06 |
| 2021/0197801 | A1 * | 7/2021 | Oh ...................... | B62D 15/0285 |
| 2021/0291679 | A1 * | 9/2021 | Yu ...................... | B62D 15/0285 |
| 2023/0103109 | A1 * | 3/2023 | Imazu .................... | G08G 1/202 340/932.2 |
| 2023/0206763 | A1 * | 6/2023 | Beaurepaire ......... | G08G 1/0145 340/932.2 |
| 2026/0042008 | A1 * | 2/2026 | Plotkin ................. | A63F 13/537 |

* cited by examiner

IoT-BASED INTELLIGENT PARKING MANAGEMENT SYSTEM

CROSS-REFERENCE TO RELATED APPLICATIONS

The application claims priority to Chinese patent application No. 202210836891.9, filed on Jul. 15, 2022, the entire contents of which are incorporated herein by reference.

TECHNICAL FIELD

The present invention relates to the technical field of Internet of Things (IoT), and in particular, to an IoT-based intelligent parking management system.

BACKGROUND

With the development of science and technology, autonomous driving technology is gradually maturing, and the design and research of vehicles with an autonomous driving function have made great progress. However, the application effect of autonomous driving technology is not ideal, which is caused by two reasons: first, the intelligent technology of vehicles is not very mature; second, the level of intelligence of supporting application scenarios is relatively lagging behind, making it difficult to form complementary application scenarios. In recent years, with the popularization of new energy technologies, the registered number of new energy vehicles is increasing, but the development of supporting facilities such as charging piles and battery swapping stations is relatively lagging behind. This situation has resulted in an imbalance in the ratio of charging piles and battery swapping stations to new energy vehicles. Especially during peak periods, the waiting time is long, and the queuing and reservation management for vehicle supporting service devices and facilities such as charging piles and charging stations is chaotic; therefore, conflicts may easily arise. Intelligent vehicles with an autonomous driving function cannot obtain comprehensive parking lot data and information in real time, so a mismatch often appears between the functional requirements of parking lots and intelligent vehicles.

SUMMARY

In view of the above technical problem that existing parking lot systems cannot match the functional requirements of intelligent vehicles, the present invention provides an IoT-based intelligent parking management system. The present invention is mainly based on an information interaction between an autonomous driving system, a mobile terminal, a parking lot management system, and a server to achieve an intelligent parking function and effective dispatch and management, thereby solving the problem of shortage of intelligent supporting utilities in actual scenarios and improving the level of system automation and intelligence.

A technical solution adopted by the present invention is as follows:

an IoT-based intelligent parking management system, including: a parking lot management system, an autonomous vehicle, and a handheld mobile terminal that are communicationally connected to each other;

the parking lot management system includes a parking lot hardware perception layer and a parking lot server, where the parking lot hardware perception layer includes a terminal node and an information transmission module deployed in a parking lot, the terminal node includes an information collection node and an execution node, data information collected by the information collection node is sent to the parking lot server through the information transmission module, and the parking lot server is configured to save and analyze data generated during operations of the parking lot, and generate and send communication data to the autonomous vehicle and the handheld mobile terminal;

the autonomous vehicle includes an autonomous driving controller and an information transmission module, where the autonomous driving controller receives the communication data from the parking lot server or the handheld mobile terminal through the information transmission module and generates control signals that control actions of a vehicle drive system, thereby controlling autonomous driving of the vehicle; and the handheld mobile terminal is provided with a human-machine interaction interface to assist in remote viewing and operation of the autonomous vehicle.

Furthermore, the parking lot is provided with ordinary parking spaces and functional parking spaces; the handheld mobile terminal sends the parking lot server a reservation request for the functional parking space, and after receiving the reservation request, the parking lot server checks a usage status of the functional parking space through the parking lot hardware perception layer:

if the functional parking space is vacant, the parking lot server locks the functional parking space and sends the handheld mobile terminal a notification of reservation success; and if the functional parking space is occupied, the parking lot server generates a waiting queue in chronological order according to a time when the reservation request is sent, and sends the handheld mobile terminal a notification of reservation failure and entry into the waiting queue.

Furthermore, after sending the handheld mobile terminal the notification of reservation failure and entry into the waiting queue, the parking lot server periodically checks the usage status of the functional parking space through the parking lot hardware perception layer, and once it finds that the functional parking space is vacant, it sends a notification that the functional parking space is available to the handheld mobile terminal that enters the waiting queue first, and searches the autonomous vehicle bound to the handheld mobile terminal through the parking lot hardware perception layer to determine a location of the autonomous vehicle.

The parking lot server generates navigation information based on the location of the autonomous vehicle, a location of the functional parking space, and site environment information of the parking lot, and sends the navigation information to the handheld mobile terminal; and the handheld mobile terminal remotely controls the autonomous vehicle to travel along a navigation path to the functional parking space.

Furthermore, the functional parking space includes at least one of an automatic charging pile, an automatic battery swapping station, an automatic vehicle washing booth, and a robot.

Furthermore, the terminal node deployed in the parking lot include cameras, ultrasonic sensors, millimeter wave radars, laser radars, geomagnetic lane induction lines, and thermal imaging sensors arranged inside the parking lot for extracting vehicle information and environment information in the parking lot.

Furthermore, the parking lot server further identifies abnormal obstacles or illegally parked vehicles in the parking lot through the parking lot hardware perception layer, and generates alarm information and pushes it to parking lot service personnel.

Compared with the prior art, the present invention has the following advantages:

The present invention provides an IoT-based intelligent parking management system, which interacts with vehicles (especially autonomous vehicles) and mobile terminals through a parking lot management system, thereby allowing a parking lot server, the vehicles, and the mobile terminals to perceive a status of a parking lot in real time based on real-time parking lot sensing information. At the same time, it can ensure coordinated management of vehicles, related devices, and related facilities in the parking lot, achieve reservation and sorting of automatic charging piles, automatic battery swapping stations, automatic vehicle washing booths, robots, and the like, and relieve and ease a shortage of supporting utilities under the rapid development of intelligent vehicles.

BRIEF DESCRIPTION OF THE DRAWINGS

To describe the technical solutions in the embodiments of the present invention or in the prior art more clearly, the following briefly describes the accompanying drawings required for describing the embodiments or the prior art. Apparently, the accompanying drawings in the following description show only some embodiments of the present invention, and a person of ordinary skill in the art may derive other drawings from these accompanying drawings without creative efforts.

DETAILED DESCRIPTION OF THE EMBODIMENTS

In order to enable those skilled in the art to better understand the technical solutions in the embodiments of the present invention, the technical solutions in the embodiments of the present invention will be clearly and completely described below with reference to the accompanying drawings in the embodiments of the present invention. Obviously, the described embodiments are only some but not all of the embodiments of the present invention. All other embodiments obtained by a person of ordinary skill in the art based on the embodiments of the present invention without creative efforts shall fall within the protection scope of the present invention.

Figure 1:
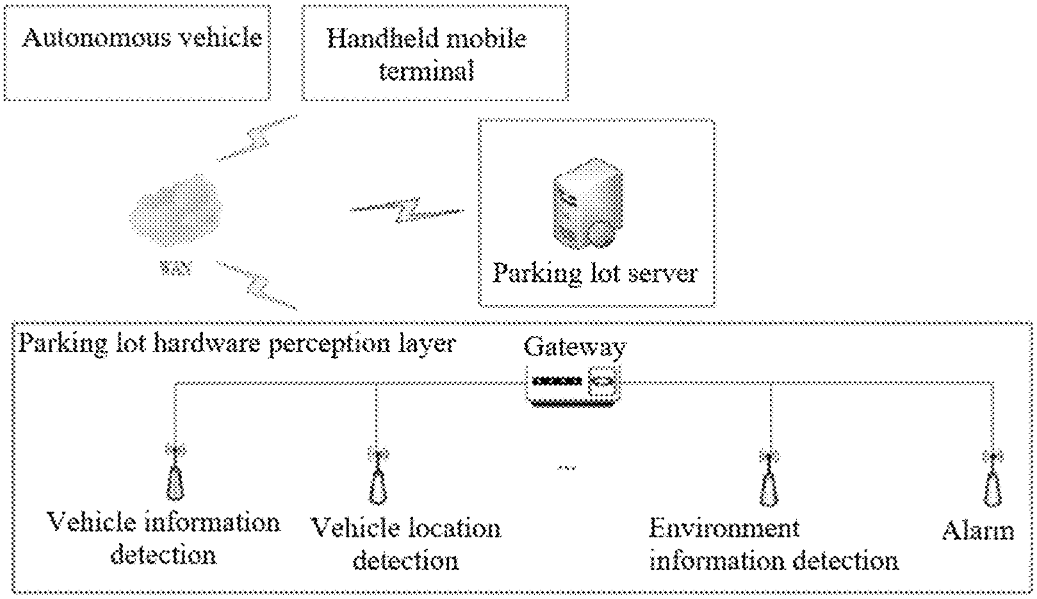
FIG. 1 is a structural diagram of an IoT-based intelligent parking management system according to the present invention.

As shown in FIG. 1, the present invention provides an IoT-based intelligent parking management system, including: a parking lot management system, an autonomous vehicle, and a handheld mobile terminal that are communicationally connected to each other.

The parking lot management system includes a parking lot hardware perception layer and a parking lot server, where the parking lot hardware perception layer includes a terminal node and an information transmission module deployed in a parking lot, the terminal node includes an information collection node and an execution node, data information collected by the information collection node is sent to the parking lot server through the information transmission module, and the parking lot server is configured to save and analyze data generated during operations of the parking lot, and generate and send communication data to the autonomous vehicle and the handheld mobile terminal.

Specifically, the terminal node arranged inside the parking lot in the present invention is mainly configured to collect and perceive a status of the parking lot in real time, and send corresponding data to the parking lot server through the information transmission module. Preferably, the information collection node includes but is not limited to IoT sensors such as cameras, ultrasonic sensors, millimeter wave radars, laser radars, geomagnetic lane induction lines, and thermal imaging sensors. The aforementioned sensors can extract internal environment information, parking space usage information, and management information of the parking lot from multiple dimensions. After receiving the information from the cameras, the parking lot server can calculate, analyze, and process the information through visual recognition algorithms, support map drawing and modification in real time, and send part of the information and results to the autonomous vehicle and the handheld mobile terminal. The execution node includes lighting devices inside the parking lot, parking lot entrance and exit gate devices, vehicle guidance devices, warning devices, and the like. When the parking lot hardware perception layer identifies abnormal obstacles or illegally parked vehicles in the parking lot, it sends relevant information to the parking lot server, and then the parking lot server pushes the information to relevant staff for handling.

Furthermore, by analyzing and managing data through the parking lot server, the present application can coordinate vehicles and parking lot facilities and devices in real time, including parking spaces, automatic charging piles, automatic battery swapping stations, automatic vehicle washing booths, and robots, make reservations and sort various vehicle requests in chronological order, and control corresponding vehicle supporting service devices and facilities to work. The aforementioned robots include but are not limited to mobile power supply robots. The parking lot server collects visual obstacle information, lane line information, parking space information, moving object information, vehicle-related information, location information, moving speed information, temperature and humidity information, biological information, and the like in real time. If an obstacle is found, early warning, detour route planning, obstacle clearing notification and arrangement, and the like are performed. The information such as whether a lane is clear or congested is collected and provided to the parking lot server for route planning. The parking space information is collected and provided to the parking lot server for parking planning and path planning. The moving object information is collected and provided to the parking lot server for identification, classification, and management. The vehicle-related information (such as whether a vehicle is modified, license plate number, vehicle driving status, and whether it is a new energy vehicle) is collected and provided to the parking lot server for registration and annotation. The location information of vehicles, parking spaces, and parking lot devices and facilities is collected and provided to the parking lot server for route planning.

The autonomous vehicle includes an autonomous driving controller and an information transmission module, where the autonomous driving controller receives the communication data from the parking lot server or the handheld mobile terminal through the information transmission module and generates control signals that control actions of a vehicle drive system, thereby controlling autonomous driving of the vehicle.

Specifically, the autonomous driving controller of the autonomous vehicle is communicationally connected to the information transmission module, a GPS module, a vehicle sensor module, and a vehicle drive module. The vehicle drive module includes a driving direction control module, a power control module, and a brake module. The parking lot server establishes a connection with the autonomous vehicle and transmits real-time map information, auxiliary navigation information, response information, and the like to the vehicle through the information transmission module. After receiving the real-time map information, the auxiliary navigation information, and a path planning instruction, the vehicle recognizes the environment and compares it with the map information obtained from the parking lot server. If the environment information of the same location is consistent and there is no obstacle information, the vehicle travels along a path planned by the parking lot server. If there are inconsistencies or obstacles, the vehicle's autonomous driving control module can plan a local path through a rolling RRT algorithm with the help of auxiliary information transmitted in real time from the parking lot server to find a route to a destination. When the parking lot server senses an abnormality through sensors and cameras and issues an abnormality warning signal, the vehicle processes and responds to the signal to reduce or avoid abnormal situations. After the vehicle travels to the destination, it sends a request to the parking lot server. After collecting vehicle information and the request in real time, the parking lot server sends instructions to relevant vehicle service devices and facilities.

Furthermore, in the present application, the parking lot server performs optimal vehicle path planning. After receiving a multi-task instruction, the parking lot server collects dynamic real-time map information and calculates an optimal path in real time based on a route between the location of the vehicle and a corresponding multi-task destination, as well as waiting time and usage time of devices and facilities for each task predicted from big data. After receiving the real-time map information, the auxiliary navigation information, and a path planning instruction, the vehicle recognizes the environment and compares it with the map information obtained from the parking lot server. If the environment information of the same location is consistent and there is no obstacle information, the vehicle travels along a path planned by the parking lot server. If there are inconsistencies or obstacles, the vehicle's autonomous driving control module can plan a local path through a rolling RRT algorithm with the help of auxiliary information transmitted in real time from the parking lot server to control the vehicle to travel on some road sections or with complete cancellation of optimal route planning. Therefore, the vehicle can travel to the destination, and send the environment information perceived on the path and the actual driving route to the parking lot server for optimization and learning.

The handheld mobile terminal is provided with a human-machine interaction interface to assist in remote viewing and operation of the autonomous vehicle.

As an exemplary embodiment of the present invention, the parking lot is provided with ordinary parking spaces and functional parking spaces; the handheld mobile terminal sends the parking lot server a reservation request for a functional parking space, and after receiving the reservation request, the parking lot server checks a usage status of the functional parking space through the parking lot hardware perception layer:

if the functional parking space is vacant, the parking lot server locks the functional parking space and sends the handheld mobile terminal a notification of reservation success; and if the functional parking space is occupied, the parking lot server generates a waiting queue in chronological order according to a time when the reservation request is sent, and sends the handheld mobile terminal a notification of reservation failure and entry into the waiting queue. After sending the handheld mobile terminal the notification of reservation failure and entry into the waiting queue, the parking lot server periodically checks the usage status of the functional parking space through the parking lot hardware perception layer, and once it finds that the functional parking space is vacant, it sends a notification that the functional parking space is available to the handheld mobile terminal that enters the waiting queue first, and searches the autonomous vehicle bound to the handheld mobile terminal through the parking lot hardware perception layer to determine a location of the autonomous vehicle; the parking lot server generates navigation information based on the location of the autonomous vehicle, a location of the functional parking space, and site environment information of the parking lot, and sends the navigation information to the handheld mobile terminal; and the handheld mobile terminal remotely controls the autonomous vehicle to travel along a navigation path to the functional parking space.

The technical solution of the present invention will be further described below in conjunction with specific embodiments.

Figure 2:
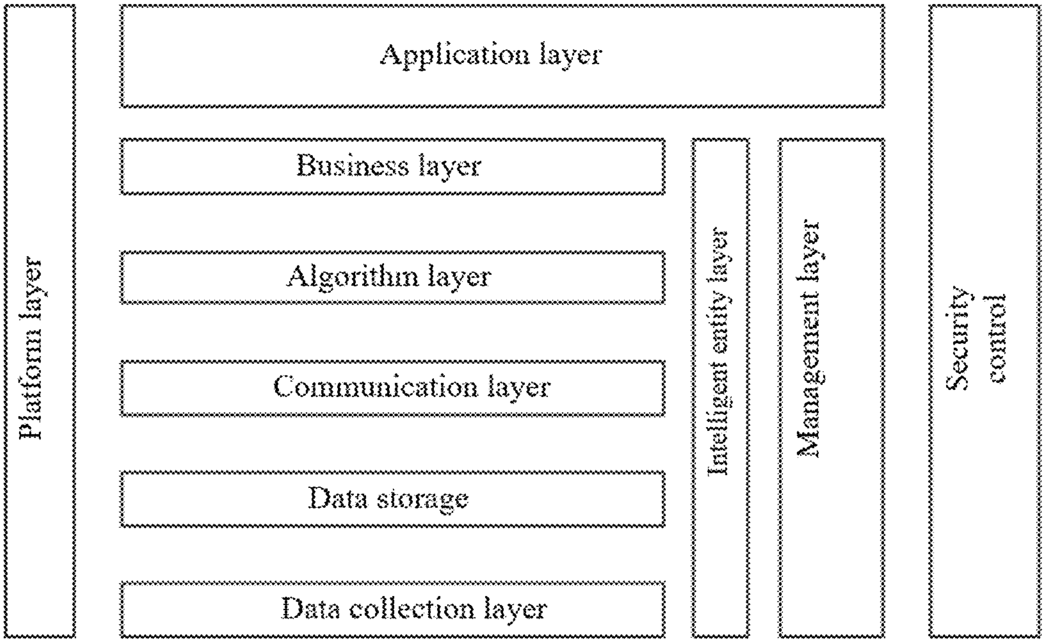
FIG. 2 is a network architecture diagram of a parking lot server in an embodiment of the present invention.

As shown in FIGS. 1-3, the embodiment discloses an IoT-based intelligent parking management system, including: a parking lot management system, an autonomous vehicle, and a handheld mobile terminal that are communicationally connected to each other.

FIG. 2 shows a network architecture of a parking lot server in the embodiment, including a data collection layer, a data layer, a communication layer, an algorithm layer, an intelligent entity layer, an application layer, a business layer, a user layer, a management layer, security control, and system operation and maintenance.

The data collection layer is configured to collect statuses and data of the parking lot, traffic flow, pedestrian flow, and various types of intelligent entities, and is communicationally connected to cameras, various sensors, radars, and various types of intelligent entities with sensors. The data layer is configured to store various types of data collected from the data collection layer, and includes a data storage module, a basic information module, a geographical information module, an environment information module, and a data fusion module, where the data storage module achieves a data storage function through distributed real-time libraries, distributed file systems, distributed caches, distributed databases, and the like; the basic information module stores user data, registration data, clearing and settlement data, and the like; the geographical information module stores GIS location information, map information, and the like; the environment information module stores temperature and humidity information, road traffic information, real-time status information of each area, and the like; and the data fusion module stores multi-dimensional information including each pixel.

The communication layer is configured to implement data transmission between units and includes long-distance communication and short-distance communication, where the long-distance communication is achieved through mobile communication, the Internet, department intranets, private networks, and small local area networks, and the short-distance communication is achieved through RFIDs, barcodes, Bluetooth, Infrared communication, Wi-Fi, zigbee, industrial fieldbuses, and the like.

The algorithm layer conducts pre-processing, feature extraction, identification, calculation, or determination on the collected data to return a corresponding result. The algorithm layer includes a path planning module, a reservation and sorting module, a visual recognition module, a three-dimensional modeling module, and a data fusion module, where the reservation and sorting module, based on collected reservation requests, provides reservation and sorting as well as predicted time series after big data prediction analysis; the path planning module conducts route planning through motion trajectory algorithms and path planning algorithms with reference to the reservation time series; the visual recognition module extracts lane lines through Hough transform and its improved algorithm as well as a median intercept method, and performs image processing, recognition, and annotation through annotation algorithms; the three-dimensional modeling module conducts space modeling through spatial modeling algorithms and point cloud data (PCD) algorithms; and the data fusion module fuses the collected data through data fusion algorithms.

The intelligent entity layer includes pan-intelligent entities such as intelligent devices and intelligent robots. By decoupling the intelligent entities of the intelligent entity layer, an intelligent parking lot achieves interaction with and control and management of the intelligent entities.

The application layer provides support to the business layer through a basic module, a parking lot status and information module, a vehicle status and information module, an intelligent entity status and information module, a service function module, an operation and maintenance module, and a settlement module, where the basic module provides support for users' basic information, service records, and membership points; the parking lot status and information module provides support for real-time map information, traffic flow information, pedestrian flow information, and real-time status information of each parking space and area; the vehicle status and information module provides support for vehicle information, vehicle identification, and vehicle location and status monitoring; the intelligent entity status and information module provides support for intelligent entity information, and intelligent entity location and status supervision; the service function module provides support for display of various types of information, path planning, service for each intelligent entity, reservation and sorting of each function, and real-time supervision of a status of each function; the operation and maintenance module provides support for parking lot access, charging data, road obstacles clearing, and illegal parking alarms; and the settlement module is configured for settlement and bank clearing of various functional units.

The business layer provides services for the user layer through a user module, a display module, and a functional module, where the user module includes registration and login, basic information, service records, membership points, and the like; the display module provides digital twins and situation presentation, and displays status information such as user status information, parking lot status information, vehicle status information, and intelligent entity status information; and the functional module provides functional services for each intelligent entity, reservation and sorting of various functions, coordinated multi-task path planning, clearing and settlement, and real-time supervision of a functional status of each area. The user layer (mobile terminal, cloud, smart city operation center, etc.) has a user portal through which users can interact with a smart parking lot system. The management layer operates and maintains the smart parking lot system, and analyzes, controls, and manages data, status, and various types of information of the system.

The IoT-based parking lot is provided with various sensors such as cameras, ultrasonic sensors, millimeter wave radars, laser radars, temperature and humidity sensors, and thermal imaging sensors, and the sensors collect data and information of the parking lot in real time and send the data and information to the parking lot server so that the parking lot server can sense and modify various information about the parking lot in real time. The IoT-based parking lot is further provided with intelligent supporting devices and facilities such as IoT-based parking spaces, automatic charging piles, automatic battery swapping stations, and automatic vehicle washing booths.

The cameras provide visual obstacle information, lane line information, parking space information, moving object and vehicle-related information, and the like; and after receiving the information from the cameras, the parking lot server can calculate, analyze, and process the information through visual recognition algorithms, support map drawing and modification in real time, and send real-time map information, auxiliary navigation information, auxiliary driving information, obstacle information, and abnormality warning signals to the autonomous vehicle and the mobile terminal. The visual recognition algorithms can use Hough transform and its improved algorithm as well as a median intercept method to extract lane lines.

Various radar sensors are configured to provide location information, moving speed information, parking space information, and the like. The temperature and humidity sensors provide parking lot temperature and humidity information and send the information to the parking lot server to assist in controlling parking lot devices and facilities. The thermal imaging sensors provide biometric information, moving object information, and vehicle-related information. Since various sensors and cameras have different functional advantages and disadvantages, a variety of sensors and cameras are needed for fused perception. In other words, the parking lot server performs debugging based on the data sent by the cameras, various sensors, and the vehicle, and generates parameters available for point cloud data (PCD) maps that display vehicle models, CityEngine that displays building models, and other modeling software, thereby achieving a data fusion effect through multi-dimensional data modeling. The parking lot server then draws and modifies a parking map in real time and provides dynamic information of the parking lot, analyzes the status of the parking lot in real time, provides timely and accurate reports and early warnings on abnormal conditions such as obstacles and illegal parking, and processes and responds to a reservation. If the sensors detect abnormal obstacles or illegally parked vehicles, they send relevant information to the parking lot server.

Figure 3A:
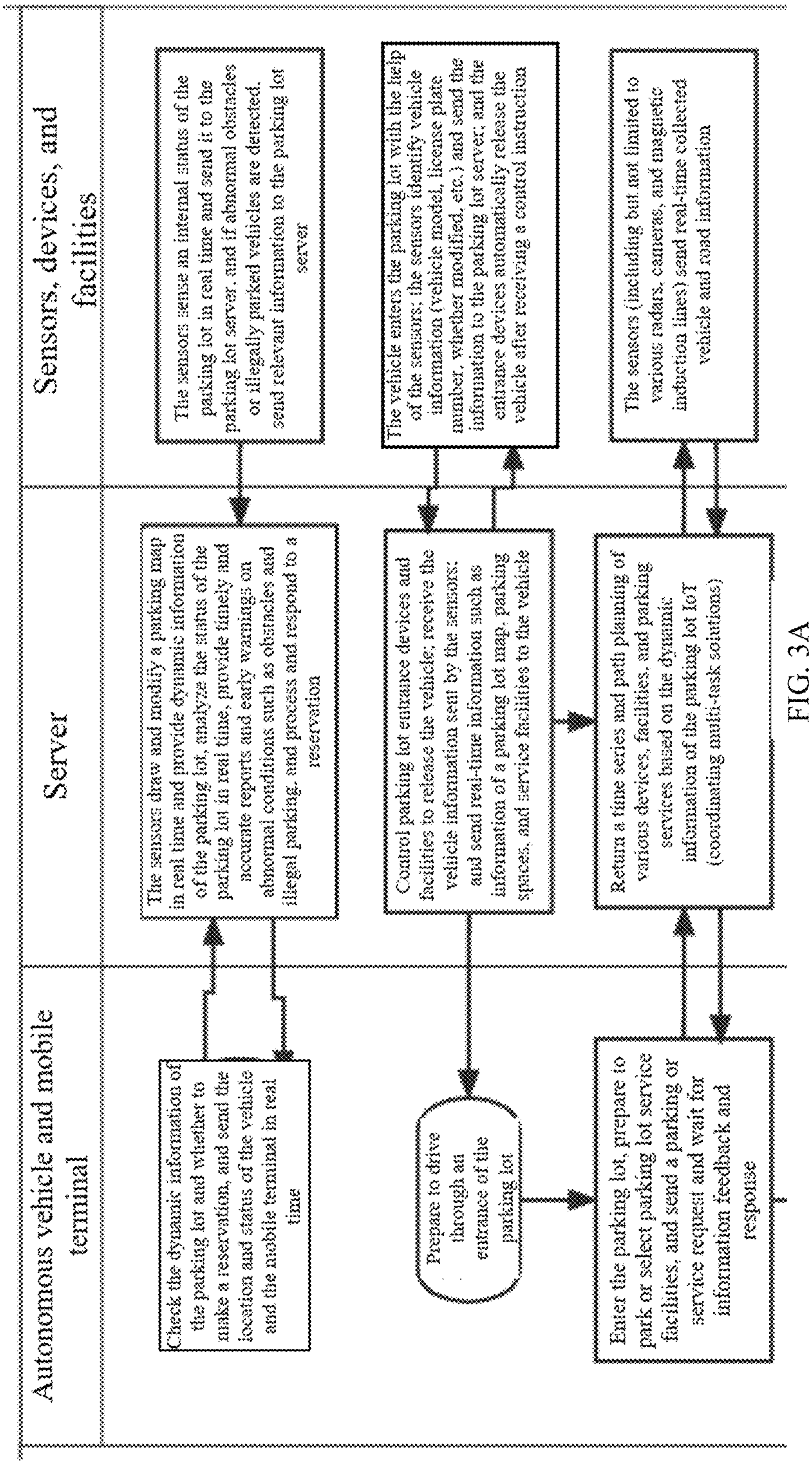
FIGS. 3A and 3B is a schematic diagram of a parking process based on a system of the present invention in an embodiment.
Figure 3B:
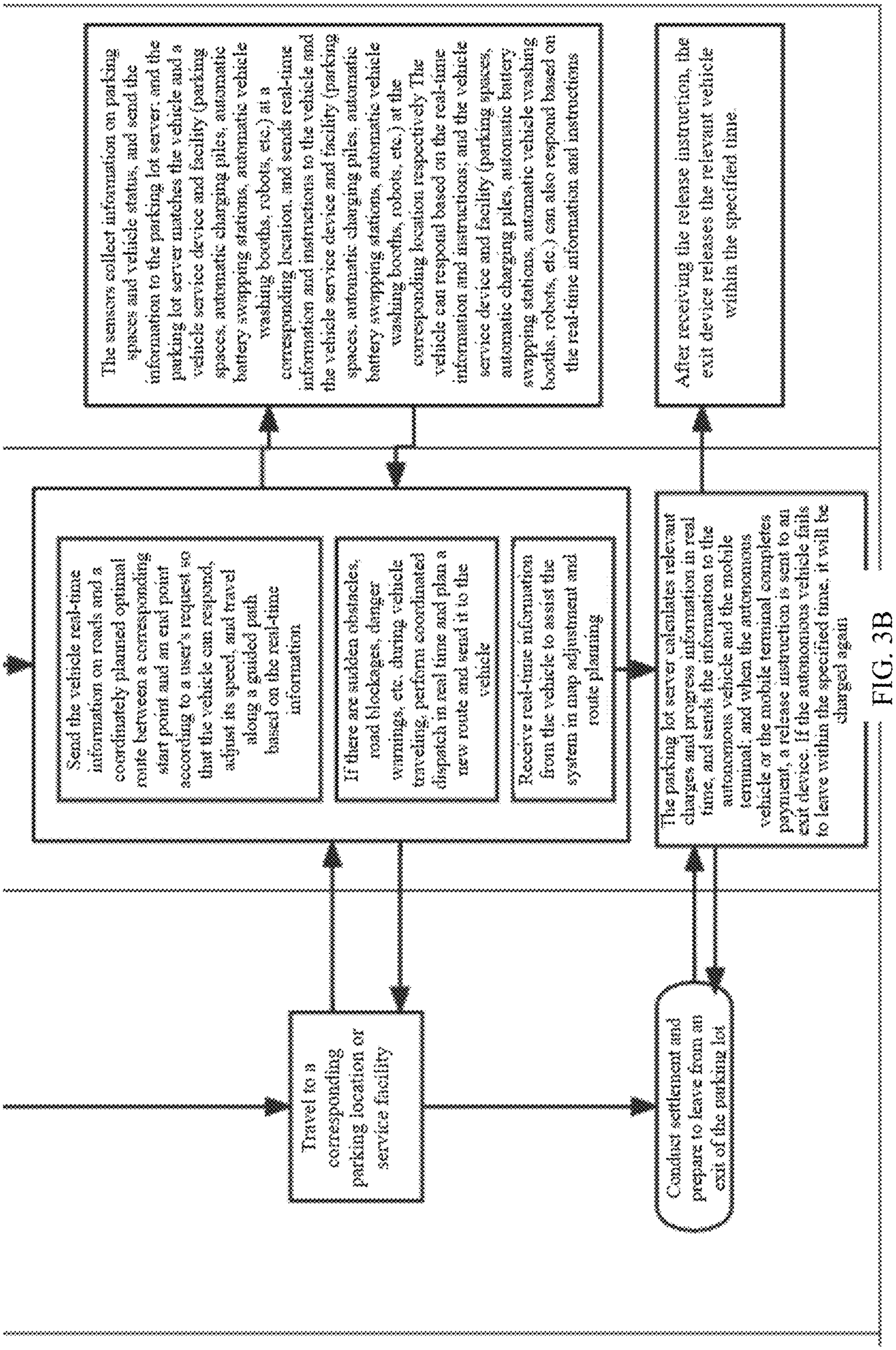

The parking lot server, the autonomous vehicle, and the mobile terminal preferably interact with each other through an APP. The autonomous vehicle and the mobile terminal can check the dynamic information of the parking lot and whether to make a reservation through the APP, and send the location and status of the vehicle and the mobile terminal in real time. As shown in FIGS. 3A and 3B, the vehicle comes and enters the parking lot with the help of the sensors. The sensors identify vehicle information (vehicle model, license plate number, whether modified, etc.) and send the information to the parking lot server; and the entrance devices automatically release the vehicle after receiving a control instruction. The parking lot server receives the vehicle information sent by the sensors, and sends real-time information such as information of a parking lot map, parking spaces, and service facilities to the vehicle.

The autonomous vehicle and the mobile terminal enter the parking lot, prepare to park or select parking lot service facilities, and send a parking or service request and wait for information feedback and response. The parking lot server returns a time series and path planning of various devices, facilities, and parking services based on the dynamic information of the parking lot IoT (coordinating multi-task solutions).

After the mobile terminal leaves the autonomous vehicle, the autonomous vehicle travels to a corresponding parking location or service facility. The sensors collect information on parking spaces and vehicle status, and send the information to the parking lot server; and the parking lot server matches the vehicle and a vehicle service device and facility (parking spaces, automatic charging piles, automatic battery swapping stations, automatic vehicle washing booths, robots, etc.) at a corresponding location, and sends real-time information and instructions to the vehicle and the vehicle service device and facility (parking spaces, automatic charging piles, automatic battery swapping stations, automatic vehicle washing booths, robots, etc.) at the corresponding location respectively. The vehicle can respond based on the real-time information and instructions; and the vehicle service device and facility (parking spaces, automatic charging piles, automatic battery swapping stations, automatic vehicle washing booths, robots, etc.) can also respond based on the real-time information and instructions. The parking lot server sends the vehicle real-time information on roads and a coordinately planned optimal route between a corresponding start point and an end point according to a user's request so that the vehicle can respond, adjust its speed, and travel along a guided path based on the real-time information. If there are sudden obstacles, road blockages, danger warnings, etc. during vehicle traveling, the parking lot server performs coordinated dispatch in real time and plans a new route and sends it to the vehicle. The parking lot server further receives real-time information from the vehicle to assist the system in map adjustment and route planning.

When the autonomous vehicle and the mobile terminal conduct settlement and prepare to leave from an exit of the parking lot, the parking lot server calculates relevant charges and progress information in real time, and sends the information to the autonomous vehicle and the mobile terminal; and when the autonomous vehicle or the mobile terminal completes payment, a release instruction is sent to an exit device. After receiving the release instruction, the exit device releases the relevant vehicle within a specified time. If the vehicle fails to leave within the specified time, it will be charged again.

Finally, it should be noted that the above embodiments are only used to illustrate the technical solutions of the present invention rather than limiting thereto. Although the present invention has been described in detail with reference to the above embodiments, those of ordinary skill in the art should understand that the technical solutions recited in the above embodiments may still be modified, or some or all of the technical features thereof may be replaced with equivalents. These modifications or replacements do not make the essence of the corresponding technical solution deviate from the scope of the technical solutions in the embodiments of the present invention.

What is claimed is:

1. An Internet of Things (IoT)-based intelligent parking management system, comprising: a parking lot management system, an autonomous vehicle, and a handheld mobile terminal that are communicationally connected to each other;

the parking lot management system comprises a parking lot hardware perception layer and a parking lot server, wherein the parking lot hardware perception layer comprises a terminal node and an information transmission module deployed in a parking lot, the terminal node comprises an information collection node and an execution node, data information collected by the information collection node is sent to the parking lot server through the information transmission module, and the parking lot server is configured to save and analyze data generated during operations of the parking lot, and generate and send communication data to the autonomous vehicle and the handheld mobile terminal;

the autonomous vehicle comprises an autonomous driving controller and an information transmission module, wherein the autonomous driving controller receives the communication data from the parking lot server or the handheld mobile terminal through the information transmission module and generates control signals that control actions of a vehicle drive system, thereby controlling autonomous driving of the vehicle;

the handheld mobile terminal is provided with a human-machine interaction interface to assist in remote viewing and operation of the autonomous vehicle;

the parking lot is provided with ordinary parking spaces and functional parking spaces, wherein the functional parking space comprises at least one of an automatic charging pile, an automatic battery swapping station, an automatic vehicle washing booth, and a robot; the handheld mobile terminal sends the parking lot server a reservation request for the functional parking space, and after receiving the reservation request, the parking lot server checks a usage status of the functional parking space through the parking lot hardware perception layer:

if the functional parking space is vacant, the parking lot server locks the functional parking space and sends the handheld mobile terminal a notification of reservation success; and if the functional parking space is occupied, the parking lot server generates a waiting queue in chronological order according to a time when the reservation request is sent, and sends the handheld mobile terminal a notification of reservation failure and entry into the waiting queue;

after sending the handheld mobile terminal the notification of reservation failure and entry into the waiting queue, the parking lot server periodically checks the usage status of the functional parking space through the parking lot hardware perception layer, and once it finds that the functional parking space is vacant, it sends a notification that the functional parking space is available to the handheld mobile terminal that enters the waiting queue first, and searches the autonomous vehicle bound to the handheld mobile terminal through the parking lot hardware perception layer to determine a location of the autonomous vehicle;

the parking lot server generates navigation information based on the location of the autonomous vehicle, a location of the functional parking space, and site environment information of the parking lot, and sends the navigation information to the handheld mobile terminal; and the handheld mobile terminal remotely controls the autonomous vehicle to travel along a navigation path to the functional parking space;

during use, through data interaction between the parking lot management system, the autonomous vehicle, and the handheld mobile terminal, a status of the parking lot is perceived based on real-time parking lot sensing information to ensure coordinated management of vehicles, related devices, and related facilities in the parking lot and achieve reservation and sorting of the automatic charging pile, the automatic battery swapping station, the automatic vehicle washing booth, and the robot;

during path planning, the parking lot server sends the vehicle real-time information on roads and a coordinately planned a route between a corresponding start point and an end point according to a user's request so that the vehicle can respond, adjust its speed, and travel along a guided path based on the real-time information; and the parking lot server further receives real-time information from the vehicle to assist the system in map adjustment and route planning;

the terminal node deployed in the parking lot comprises cameras, ultrasonic sensors, millimeter wave radars, laser radars, geomagnetic lane induction lines, and thermal imaging sensors arranged inside the parking lot for extracting vehicle information and environment information in the parking lot;

the thermal imaging sensors provide biometric information, moving object information, and vehicle-related information;

the parking lot server further identifies abnormal obstacles or illegally parked vehicles in the parking lot through the parking lot hardware perception layer, and generates alarm information and pushes it to parking lot service personnel;

if there are sudden obstacles, road blockages, danger warnings, etc. during vehicle traveling, the parking lot server performs coordinated dispatch in real time and plans a new route and sends it to the vehicle;

the parking lot server comprises a data collection layer, a data layer, a communication layer, an algorithm layer, an intelligent entity layer, an application layer, a business layer, a user layer, and a management layer;

the data collection layer is configured to collect statuses and data of the parking lot, traffic flow, pedestrian flow, and various types of intelligent entities;

the data layer is configured to store various types of data collected from the data collection layer;

the communication layer is configured to implement data transmission;

the algorithm layer conducts pre-processing, feature extraction, identification, calculation, or determination on the collected data to return a corresponding result;

the algorithm layer comprises a path planning module, a reservation and sorting module, a visual recognition module, a three-dimensional modeling module, and a data fusion module;

the three-dimensional modeling module conducts space modeling through spatial modeling algorithms and point cloud data (PCD) algorithms; and the data fusion module fuses the collected data through data fusion algorithms;

the user layer has a user portal through which users can interact with a smart parking lot system;

the business layer is configured to provide services for the user layer;

the application layer is configured to provide support to the business layer;

the management layer operates and maintains the smart parking lot system, and analyzes, controls, and manages data, status, and various types of information of the system;

the parking lot server draws and modifies a parking map in real time and provides dynamic information of the parking lot, analyzes the status of the parking lot in real time, and provides timely and accurate reports and early warnings on abnormal conditions such as obstacles and illegal parking;

the terminal node deployed in the parking lot further comprises temperature and humidity sensors; and the temperature and humidity sensors are configured to collect parking lot temperature and humidity information and send the information to the parking lot server to assist in controlling parking lot devices and facilities.

* * * * *